US006987142B2

United States Patent
St. Clair et al.

(10) Patent No.: US 6,987,142 B2
(45) Date of Patent: *Jan. 17, 2006

(54) ADHESIVES AND SEALANTS FROM CONTROLLED DISTRIBUTION BLOCK COPOLYMERS

(75) Inventors: David J. St. Clair, Houston, TX (US); Dale Lee Handlin, Jr., Houston, TX (US); Carl L. Willis, Houston, TX (US)

(73) Assignee: KRATON Polymers U.S. LLC, Houston, TX (US)

( * ) Notice: Subject to any disclaimer, the term of this patent is extended or adjusted under 35 U.S.C. 154(b) by 94 days.

This patent is subject to a terminal disclaimer.

(21) Appl. No.: 10/359,927

(22) Filed: Feb. 6, 2003

(65) Prior Publication Data

US 2003/0176574 A1    Sep. 18, 2003

Related U.S. Application Data

(63) Continuation of application No. 60/355,210, filed on Feb. 7, 2002.

(51) Int. Cl.
*C08L 53/02*    (2006.01)

(52) U.S. Cl. .................. 524/505; 525/89; 525/192

(58) Field of Classification Search ................ 525/88, 525/271, 98, 89, 192; 524/505
See application file for complete search history.

(56) References Cited

U.S. PATENT DOCUMENTS

| 2,975,160 A | 3/1961 | Zelinski |
| 3,149,182 A | 9/1964 | Porter |
| 3,239,478 A | 3/1966 | Harlan, Jr. |
| RE27,145 E | 6/1971 | Jones |
| 3,595,942 A | 7/1971 | Wald et al. |
| 3,600,250 A | 8/1971 | Evans |
| 3,634,549 A | 1/1972 | Shaw et al. |
| 3,670,054 A | 6/1972 | De La Mare et al. |
| 3,700,633 A | 10/1972 | Wald et al. |
| 4,073,831 A | 2/1978 | Tabana et al. |
| 4,089,913 A | 5/1978 | Miki et al. |
| 4,107,131 A | 8/1978 | Gergen et al. |
| 4,367,325 A | 1/1983 | Takeuchi et al. |
| 4,412,087 A | 10/1983 | Trepka |
| 4,547,560 A | 10/1985 | Hattori et al. |
| 4,578,429 A | 3/1986 | Gergen et al. |
| 4,603,155 A | 7/1986 | Muramori et al. |
| 4,898,914 A | 2/1990 | Gergen et al. |
| 4,970,265 A | 11/1990 | Willis |
| 5,075,377 A | 12/1991 | Kawabuchi et al. |
| 5,191,024 A | 3/1993 | Shibata et al. |
| 5,206,300 A | 4/1993 | Chamberlain |
| 5,276,101 A | 1/1994 | Chamberlain et al. |
| 5,290,875 A | 3/1994 | Moczygemba et al. |
| 5,306,779 A | 4/1994 | Shibata et al. |
| 5,346,964 A | 9/1994 | Shibata et al. |
| 5,506,299 A | 4/1996 | Gelles et al. |
| 5,516,831 A | 5/1996 | Pottick et al. |
| 5,545,690 A | 8/1996 | Trepka et al. |
| 5,603,155 A | 2/1997 | Satomi et al. |
| 5,910,546 A | 6/1999 | Trepka et al. |
| 6,031,053 A | 2/2000 | Knoll et al. |
| 6,107,411 A | 8/2000 | Toya et al. |
| 6,197,889 B1 | 3/2001 | Knoll et al. |
| 6,265,484 B1 | 7/2001 | Trepka et al. |
| 6,265,485 B1 | 7/2001 | Trepka et al. |
| 6,423,420 B1 * | 7/2002 | Brant et al. ............... 428/516 |
| 2003/0181584 A1 * | 9/2003 | Handlin et al. ............ 525/88 |

FOREIGN PATENT DOCUMENTS

| EP | 0 492 490 B1 | 8/1996 |
| EP | 0 877 038 A2 | 11/1998 |
| EP | 0 654 488 B1 | 1/1999 |
| EP | 0 398 758 B1 | 3/1999 |
| EP | 0 859 803 B1 | 12/1999 |
| EP | 0 927 210 B1 | 6/2000 |
| EP | 0 766 706 B1 | 12/2001 |
| GB | 2 138 009 A | 10/1984 |
| JP | 60-163910 | 8/1985 |
| JP | 61-291610 | 12/1986 |
| JP | 6-271717 | 9/1994 |
| JP | 7-149952 | 6/1995 |
| WO | 00/58380 | 10/2000 |

* cited by examiner

*Primary Examiner*—Jeffrey Mullis
(74) *Attorney, Agent, or Firm*—Dean F. Vance; Michael A. Masse

(57) ABSTRACT

The present invention relates to adhesives and sealants prepared from novel anionic block copolymers of mono alkenyl arenes and conjugated dienes, and to blends of such block copolymers with other polymers. The block copolymers are selectively hydrogenated and have mono alkenyl arene end blocks and controlled distribution blocks of mono alkenyl arenes and conjugated dienes. The block copolymer may be combined with tackifying resins, oils and other components to form the adhesives and sealants of the present invention.

36 Claims, No Drawings

ADHESIVES AND SEALANTS FROM CONTROLLED DISTRIBUTION BLOCK COPOLYMERS

CROSS-REFERENCE TO RELATED APPLICATIONS

The present application is related to, commonly assigned U.S. patent application Ser. No. 10/359,981 entitled Novel Block Copolymers and Method for Making Same, now published as US2003/0176582 A1, commonly assigned U.S. patent application Ser. No. 10/359,906 entitled Polymer Modified Bitumen Compositions, now U.S. Pat. No. 6,759,454, commonly assigned U.S. patent application Ser. No. 10/359,953 entitled Articles Prepared from Controlled Distribution Block Copolymers, now published as US2003/0166776 A1, commonly assigned U.S. patent application Ser. No. 10/359,907 entitled Articles Prepared From Hydrogenated Controlled Distribution Block Copolymers, now published as US2003/0181585 A1, commonly assigned U.S. patent application Ser. No. 10/359,462 entitled Gels From Controlled Distribution Block Copolymers, now published as US2003/0153681 A1, all of which were filed Feb. 6, 2003 and commonly assigned International Patent Application Ser. No. PCT/NL03/00098 filed on Feb. 7, 2003 entitled Solvent-Free, Hot Melt Adhesive Composition Comprising a Controlled Distribution Block Copolymer, now published as WO 03/066769 A1, and, commonly assigned U.S. patent application Ser. No. 10/745,352 filed Dec. 12, 2003, entitled Gels from Controlled Distribution Black Copolymers, now published as US2004/0138371 A1, which is a continuation-in-part of U.S. patent application Ser. No. 10/359,462, and, commonly assigned U.S. patent application Ser. No. 10/681,608 filed Oct. 8, 2003 entitled Photopolymerizable Compositions and Flexographic Printing Plates Prepared from Controlled Distribution Block Copolymers, now published as US2004/0072951, all of which claim the benefit of U.S. Provisional Patent Application Ser. No. 60/355,210 filed Feb. 7, 2002.

BACKGROUND OF THE INVENTION

1. Field of the Invention

This invention relates to adhesives and sealants prepared from novel anionic block copolymers of mono alkenyl arenes and conjugated dienes.

2. Background of the Art

The preparation of block copolymers of mono alkenyl arenes and conjugated dienes is well known. One of the first patents on linear ABA block copolymers made with styrene and butadiene is U.S. Pat. No. 3,149,182. These polymers in turn could be hydrogenated to form more stable block copolymers, such as those described in U.S. Pat. No. 3,595,942 and U.S. Pat. No. Re. 27,145. Such polymers are broadly termed Styrenic Block Copolymers or SBC's.

SBC's have a long history of use as adhesives and sealants. For example, U.S. Pat. No. 3,239,478 ("Harlan") discloses adhesives comprising unsaturated styrene-isoprene-styrene block copolymers ("SIS") and styrene-butadiene-styrene block copolymers ("SBS") in adhesives and sealants. Harlan also broadly discloses adhesives comprising the hydrogenated S-B-S (i.e. "SEBS") and hydrogenated S-I-S (i.e. "SEPS") block copolymers with tackifying resins and extender oils for a variety of adhesives and sealants, including pressure sensitive adhesives. It is known in the art that resins which are compatible with the rubber segment of the SBC's are responsible for development of tack in pressure sensitive adhesives. Heretofore, it has not been possible to prepare SBC's in which the compatibility characteristics of the rubber segment could be controlled by the polymer manufacturer. Therefore, much work has been done by resin manufacturers to develop new resins tailored for optimum compatibility with each of the different types of SBC. For example, aliphatic resins have good compatibility with SIS and SEBS (i.e. hydrogenated SBS polymers) type SBC's but not with SBS type. New aliphatic/aromatic resins have been developed which have good compatibility with SBS type SBC's. This invention comprises a new class of SBC's in which the polymer manufacturer can vary the compatibility characteristics of the rubber segment.

It is also known in the literature that unsaturated SBS and SIS polymers are susceptible to oxidative degradation during processing in hot melt adhesives and sealants and that the hydrogenated analogs have much better resistance to degradation during hot melt processing. The rubber segments in the hydrogenated SBC's are more highly entangled than the rubber segments in the unsaturated SBS and SIS polymers. Therefore, in formulations at a constant polymer content, PSA based on the hydrogenated SBC's generally have poorer tack than PSA based on the unhydrogenated SBC's. It would be desirable to use blends of hydrogenated and unsaturated SBC's to get the best balance of melt stability and tack. However, due to differences in compatibility, adhesives based on blends of SEBS and SIS polymers, for example, were not compatible. Usually adhesives based on these blends are hazy initially and phase separate upon standing. Adhesive films based on these blends lacked the high gloss of adhesives based on compatible adhesives and usually the properties of these adhesives were poor.

Now a novel anionic block copolymer based on mono alkenyl arene end blocks and controlled distribution mid blocks of mono alkenyl arenes and conjugated dienes has been discovered and is described in copending, commonly assigned U.S. patent application Ser. No. 60/355,210, entitled "NOVEL BLOCK COPOLYMERS AND METHOD FOR MAKING SAME". Methods for making such polymers are described in detail in the above-mentioned patent application. Patentees have found that the resin compatibility of these new polymers is indeed different from conventional hydrogenated SBC's which will allow resin manufacturers the opportunity to develop new resins which are compatible with these novel SBC's. Patentees have also found that phase stable, clear adhesives can be made using blends of unsaturated SBC's, especially certain SIS polymers, with these new polymers. This allows formulators to develop hot melt PSA's which have the good melt stability found for hydrogenated SBC's but better tack.

SUMMARY OF THE INVENTION

In one aspect of the present invention we have discovered a novel adhesive composition comprising 100 parts by weight of at least one hydrogenated block copolymer having a controlled distribution block of a mono alkenyl arene and conjugated diene, 25 to 300 parts by weight of at least one tackifying resin, and 0 to 200 parts by weight of an extender oil. The hydrogenated block copolymer has at least one polymer block A and at least one polymer block B wherein (a.) prior to hydrogenation each A block is a mono alkenyl arene homopolymer block and each B block is a controlled distribution copolymer block of at least one conjugated diene and at least one mono alkenyl arene; (b.) subsequent to hydrogenation about 0–10 % of the arene double bonds have been reduced, and at least about 90% of the conjugated diene double bonds have been reduced; (c.) each A block having a number average molecular weight between about 3,000 and about 60,000 and each B block having a number average molecular weight between about 30,000 and about 300,000; (d.) each B block comprises terminal regions adjacent to the A blocks that are rich in conjugated diene units and one or more regions not adjacent to the A blocks that are rich in mono alkenyl arene units; (e.) the total amount of mono alkenyl arene in the hydrogenated block copolymer is about 20 percent weight to about 80 percent weight; and (f.) the weight percent of mono alkenyl arene in each B block is between about 10 percent and about 75 percent. The general configuration of the block copolymer is A-B, A-B-A, $(A-B)_n$, $(A-B)_n$-A, $(A-B-A)_n X$ or $(A-B)_n X$; where n is an integer from 2 to about 30, preferably 2 to about 15, more preferably 2 to about 6, and X is coupling agent residue. The adhesive compositions of the present invention include hot melt adhesives, pressure sensitive adhesives, solvent-based adhesives, and the like.

In another aspect of the present invention we have shown that a clear, phase stable adhesive composition can be prepared with the controlled distribution block copolymers in blends with certain SIS type SBC's. This adhesive composition comprises 100 parts by weight of the controlled distribution block copolymer, about 25 to about 300 parts by weight of a styrene/isoprene unhydrogenated block copolymer, about 50 to about 400 parts by weight of a tackifying resin, and about 0 to about 200 parts by weight of a polymer extending oil. The novel polymers can be added to an adhesive based on an SIS polymer to improve stability or an SIS polymer can be included in an adhesive based on the novel polymer to improve tack.

DETAILED DESCRIPTION OF THE PREFERRED EMBODIMENTS

The key component of the present invention is the novel block copolymer containing mono alkenyl arene end blocks and a unique mid block of a mono alkenyl arene and a conjugated diene. Surprisingly, the combination of (1) a unique control for the monomer addition and (2) the use of diethyl ether or other modifiers as a component of the solvent (which will be referred to as "distribution agents") results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. For purposes hereof, "controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average number of) mono alkenyl arene units; and (3) an overall structure having relatively low blockiness. For the purposes hereof, "rich in" is defined as greater than the average amount, preferably greater than 5% of the average amount. This relatively low blockiness can be shown by either the presence of only a single glass transition temperature (Tg) intermediate between the Tg's of either monomer alone, when analyzed using differential scanning calorimetry ("DSC") thermal methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows:

First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, *High Resolution NMR of Macromolecules* (Academic Press, New York and London, 1972), chapter 6.

The styrene blockiness is simply the percentage of blocky styrene to total styrene units:

Blocky %=100 times (Blocky Styrene Units/Total Styrene Units)

Expressed thus, Polymer-Bd-S-(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10.

This controlled distribution structure is very important in managing the strength and Tg of the resulting copolymer, because the controlled distribution structure ensures that there is virtually no phase separation of the two monomers, i.e., in contrast with block copolymers in which the monomers actually remain as separate "microphases", with distinct Tg's, but are actually chemically bonded together. This controlled distribution structure assures that only one Tg is present and that, therefore, the thermal performance of the resulting copolymer is predictable and, in fact, predeterminable. Furthermore, when a copolymer having such a controlled distribution structure is then used as one block in a di-block, tri-block or multi-block copolymer, the relatively higher Tg made possible by means of the presence of an appropriately-constituted controlled distribution copolymer region will tend to improve flow and processability. Modification of certain other properties is also achievable.

In a preferred embodiment of the present invention, the subject controlled distribution copolymer block has two distinct types of regions—conjugated diene rich regions on the ends of the block and a mono alkenyl arene rich region near the middle or center of the block. What is desired is a mono alkenyl arene/conjugated diene controlled distribution copolymer block, wherein the proportion of mono alkenyl arene units increases gradually to a maximum near the middle or center of the block and then decreases gradually until the polymer block is fully polymerized. This structure is distinct and different from the tapered and/or random structures discussed in the prior art.

Starting materials for preparing the novel controlled distribution copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

As discussed above, the controlled distribution polymer block has diene rich region(s) adjacent to the A block and an arene rich region not adjacent to the A block, and typically near the center of the B block. Typically the region adjacent to the A block comprises the first 15 to 25% of the block and comprises the diene rich region(s), with the remainder considered to be arene rich. The term "diene rich" means that the region has a measurably higher ratio of diene to arene than the arene rich region. Another way to express this is the proportion of mono alkenyl arene units increases gradually along the polymer chain to a maximum near the middle or center of the block (if we are describing an ABA structure) and then decreases gradually until the polymer block is fully polymerized. For the controlled distribution block B the weight percent of mono alkenyl arene is between about 10 percent and about 75.

As used herein, "thermoplastic block copolymer" is defined as a block copolymer having at least a first block of a mono alkenyl arene, such as styrene and a second block of a controlled distribution copolymer of diene and mono alkenyl arene. The method to prepare this thermoplastic block copolymer is via any of the methods generally known for block polymerizations. The present invention includes as an embodiment a thermoplastic copolymer composition, which may be either a di-block, tri-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as end-blocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A-B-A configuration, the blocks can be structured to form a radial (branched) polymer, $(A-B)_nX$, or both types of structures can be combined in a mixture. Some A-B diblock polymer can be present but preferably at least about 30 weight percent of the block copolymer is A-B-A or radial (or otherwise branched so as to have 2 or more terminal resinous blocks per molecule) so as to impart strength.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5000 to 45,000 for the A block and 50,000 to about 250,000 for the B block. For the triblock, which may be a sequential ABA or coupled $(AB)_2$ X block copolymer, the A blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000. These molecular weights are most accurately determined by light scattering measurements, and are expressed as number average molecular weights.

Another important aspect of the present invention is to control the microstructure or vinyl content of the conjugated diene in the controlled distribution copolymer block. The term "vinyl content" refers to a conjugated diene which is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis, preferably about 30 to about 70 mol percent of the condensed butadiene units should have 1,2-vinyl configuration. This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re 27,145, which disclosure is incorporated by reference.

An important feature of the thermoplastic elastomeric di-block and tri-block polymers of the present invention, including one or more controlled distribution diene/alkenyl arene copolymer blocks and one or more mono alkenyl arene blocks, is that they have at least two Tg's, the lower being the combined Tg of the controlled distribution copolymer block which is an intermediate of its constituent monomers' Tg's. Such Tg is preferably at least about −60 degrees C., more preferably from about −40 degrees C. to about +30 degrees C., and most preferably from about −40 degrees C. to about +10 degrees C. The second Tg, that of the mono alkenyl arene "glassy" block, is preferably more than about 80 degrees C., more preferably from about +80 degrees C. to about +110 degrees C. The presence of the two Tg's, illustrative of the microphase separation of the blocks, contributes to the notable elasticity and strength of the material in a wide variety of applications, and its ease of processing and desirable melt-flow characteristics.

The block copolymer is selectively hydrogenated. Hydrogenation can be carried out via any of the several hydrogenation or selective hydrogenation processes known in the prior art. For example, such hydrogenation has been accomplished using methods such as those taught in, for example, U.S. Pat. Nos. 3,494,942; 3,634,594; 3,670,054; 3,700,633; and Re. 27,145. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

In an alternative, the block copolymer of the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. No. 4,578,429 and in U.S. Pat. No. 5,506,299. In another manner the selectively hydrogenated block copolymer of the present invention may be functionalized by grafting silicon or boron containing compounds to the polymer as taught in U.S. Pat. No. 4,882,384. In still another manner, the block copolymer of the present invention may be contacted with an alkoxysilane compound to form silane-modified block copolymer. In yet another manner, the block copolymer of the present invention may be functionalized by reacting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by grafting sulfonic groups to the polymer as taught in U.S. Pat. No. 5,516,831.

One of the components used in the adhesives and sealants of the present invention is a tackifying resin. Tackifying resins include both polystyrene block compatible resins and mid block compatible resins. The polystyrene block compatible resin may be selected from the group consisting of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the hydrogenated (mid) block may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosin derivatives and mixtures thereof. These resins are e.g. sold under the trademarks "REGALITE", "REGALREZ", "ESCOREZ", "WINGTACK" and "ARKON".

Another one of the components used in the adhesives and sealants of the present invention is a polymer extending oil or plasticizer. Especially preferred are the types of oils that are compatible with the elastomeric segment of the block copolymer. While oils of higher aromatics content are satisfactory, those petroleum-based white oils having low volatility and less than 50% aromatic content are preferred. Such oils include bothparaffinic and naphthenic oils. The oils should additionally have low volatility, preferable having an initial boiling point above about 500° F.

Examples of alternative plasticizers which may be used in the present invention are oligomers of randomly or sequentially polymerized styrene and conjugated diene, oligomers of conjugated diene, such as butadiene or isoprene, liquid polybutene-1, and ethylene-propylene-diene rubber, all having a weight average molecular weight in the range from 300 to 35,000, preferable less than about 25,000 mol weight.

The amount of oil or plasticizer employed varies from about 0 to about 300 parts by weight per hundred parts by weight rubber, or block copolymer, preferably about 20 to about 150 parts by weight.

Pressure sensitive adhesives are formulated to give a satisfactory balance of tack, peel, shear and viscosity. Generally, SIS polymers having molecular weights from about 100,000 to 350,000 and styrene contents in the 12% weight to 20% weight are most widely used because they give very good tack and good shear. However, they must be protected against degradation if they are being mixed and applied as hot melts and, in the final PSA tape or label, they are not intended for prolonged use at high temperature or when exposed to sunlight because the SIS polymers will degrade. In contrast, SEBS polymers have excellent degradation resistance when exposed to high temperatures or sunlight but generally, they give adhesives with limited tack in formulations which have good shear. It has been found that, if SEBS polymer is blended into a PSA based on an SIS polymer to improve degradation resistance, the adhesive usually turns cloudy and phase separates. If SIS polymer is blended into a PSA based on an SEBS polymer to improve tack, again the adhesive usually turns cloudy and phase separates. It has been found that the novel polymers can be blended with the preferred SIS polymers and the adhesives are clear and do not phase separate upon standing. The novel polymers which work best with the preferred SIS polymers are those which have molecular weights between about 25,000 and about 150,000 and which have styrene contents in the endblock phase of about 15% weight to about 25% weight and which have about 25% weight styrene copolymerized into the rubber segment.

Various types of fillers and pigments can be included in the adhesive formulations to pigment the adhesive and reduce cost. Suitable fillers include calcium carbonate, clay, talc, silica, zinc oxide, titanium dioxide and the like. The amount of filler usually is in the range of 0 to 30% weight based on the solvent free portion of the formulation, depending on the type of filler used and the application for which the adhesive is intended. An especially preferred filler is titanium dioxide.

If the adhesive is to be applied from solvent solution, the organic portion of the formulation will be dissolved in a solvent or blend of solvents. Aromatic hydrocarbon solvents such as toluene, xylene or Shell Cyclo Sol 53 are suitable. Aliphatic hydrocarbon solvents such as hexane, naphtha or mineral spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50% wt in the solvent blend.

The compositions of the present invention may be modified further with the addition of other polymers, oils, fillers, reinforcements, antioxidants, stabilizers, fire retardants, anti blocking agents, lubricants and other rubber and plastic compounding ingredients without departing from the scope of this invention. Such components are disclosed in various patents including U.S. Pat. No. 3,239,478; and U.S. Pat. No 5,777,043, the disclosures of which are incorporated by reference.

The compositions of the present invention may be designed for a wide variety of uses and applications. They may be applied to paper, paper boards, wood, metal foils, polyolefin films, polyvinyl chloride films, cellophane, felts, woven fabrics, non-woven fabrics, glass, etc., and for bonding two or more of such materials together. The adhesives are useful in pressure sensitive tapes, such as masking tapes, adhesive sheets, primers for other adhesives, adhesive tapes, mending tapes, electrical insulation tape, laminates, hot-melt adhesives, mastics, cements, caulking compounds, binders, sealants, delayed tack adhesives, adhesive lattices, carpet backing, cements, etc.

Regarding the relative amounts of the various ingredients, this will depend in part upon the particular end use and on the particular block copolymer that is selected for the particular end use. Table A below shows some notional compositions that are included in the present invention. "CD Polymer" refers to the controlled distribution polymer of the present invention:

TABLE A

Applications, Compositions and Ranges

| Application | Ingredients | Composition, Parts by weight |
|---|---|---|
| Adhesive | CD Polymer | 100 |
| | Tackifying Resin | 25 to 300 |
| | Extending Oil | 0 to 200 |
| Hot melt adhesive (preferred range) | CD Polymer | 100 |
| | Tackifying Resin | 75 to 200 |
| | End Block Resin | 0 to 50 |
| | Extending Oil | 0 to 150 |
| Solvent based adhesive (not including solvent) | CD Polymer | 100 |
| | Tackifying Resin | 25 to 300 |
| | Oil | 0 to 100 |
| Pressure sensitive adhesive | CD Polymer | 100 |
| | Styrene/Isoprene Block Copolymer | 25 to 300 |
| | Tackifying Resin | 50 to 500 |
| | Oil | 0 to 200 |
| Construction adhesive or sealant | CD Polymer | 100 |
| | Tackifying Resin | 0 to 200 |
| | Endblock Resin | 0 to 200 |
| | Calcium Carbonate | 100 to 800 |

EXAMPLES

The following examples are provided to illustrate the present invention. The examples are not intended to limit the scope of the present invention and they should not be so interpreted. Amounts are in weight parts or weight percentages unless otherwise indicated. The test methods used in the examples are American Society for Testing Materials (ASTM) test methods, and the following specific methods were used:

| | |
|---|---|
| Rolling ball tack | ASTM D-3121 |
| Polyken probe tack | ASTM D-2979 |
| Loop Tack | ASTM D-6195 |
| 180° Peel | ASTM D-903 |
| Holding Power | ASTM D-6463 |
| SAFT | ASTM D-4498 |
| Melt Viscosity | ASTM D-3236 |
| Heat Aging Viscosity Stability | ASTM D-4499 |

Example 1

Various controlled distribution block copolymers of the present invention were prepared according to the process disclosed in copending patent application Serial No. 60/355, 210 referenced above, including it's continuing application filed concurrently. All polymers were selectively hydrogenated AB or ABA block copolymers where the A blocks were polystyrene blocks and the B block prior to hydrogenation was a styrene butadiene controlled distribution block having terminal regions that are rich in butadiene units and a center region that was rich in styrene units. The various polymers are shown in Table 1 below. These polymers were then used in the various applications described in the other Examples. Step I MW is the molecular weight of the first A block, Step II MW is the molecular weight of the AB blocks and Step III MW is the molecular weight of the ABA blocks. The polymers were hydrogenated such that greater than about 95% of the diene double bonds have been reduced.

TABLE 1

Controlled Distribution Polymers

| Polymer Number | Step I MW(k) | Step II MW(k) | Step III MW(k) | % Styrene in Mid Block B | Styrene Blockiness | 1,2-BD (%) | PSC (%) |
|---|---|---|---|---|---|---|---|
| 25 | 9.1 | 89 | 97 | 25.7 | 0 | 36 | 39 |
| 27 | 7.5 | 70 | 77 | 26 | 3 | 36.1 | 40 |
| 28 | 7.8 | 39 | — | 25.4 | 16 | 36 | 39 |
| 26 | 7.3 | 43 | 50 | 37 | 0 | 36.7 | 47 | where "MW(k)"=molecular weight in thousands and "PSC (%)"=wt % of styrene in the final polymer. "Styrene Blockiness" is for just the B block.

Accordingly, Polymer #25 is a linear ABA tri-block copolymer having number average block mol weights of 9,500-80,000-9,500; Polymer #27 is a linear ABA tri-block copolymer having block mol weights of 7,500-62,600-7, 300; Polymer #28 is an AB di-block copolymer having block mol weights of 7,800–31,500; and Polymer #26 is a linear ABA tri-block copolymer having block mol weights of 7,300-35,800-7,300.

Example 2

Example 2 shows the effect of tackifying resin composition on compatibility with the rubber midblock segment of CD Polymer #25. Nuclear Magnetic Resonance (NMR) analysis shows that the Wingtack Resins, available from Goodyear, are primarily aliphatic $C_5$ type resins but they were polymerized using mixtures of a $C_5$ stream and an aromatic $C_9$ stream. They differ primarily in their aromatic content. NMR shows the fraction of aromatic protons in Wingtack 95, Plus, Extra, ET and 86 are 0, 1.7, 2.5, 4.2 and 9.4, respectively. Results show that all of the resins are effective tackifiers for this CD Polymer #25. The resin with the lowest aromatic content gave the best Polyken Probe Tack while the resin with the highest aromatic content gave the best Rolling BallTack. Shellflex 371 is a naphthenic extending oil having a Tg of −64° C.

TABLE 2

|  | #2-1 | #2-2 | #2-3 | #2-4 | #2-5 |
| --- | --- | --- | --- | --- | --- |
| Composition, phr |  |  |  |  |  |
| CD Polymer #25 | 100 | 100 | 100 | 100 | 100 |
| WINGTACK 95 | 140 |  |  |  |  |
| WINGTACK PLUS |  | 140 |  |  |  |
| WINGTACK EXTRA |  |  | 140 |  |  |
| WINGTACK ET |  |  |  | 140 |  |
| WINGTACK 86 |  |  |  |  | 140 |
| SHELLFLEX 371 | 40 | 40 | 40 | 40 | 40 |
| Properties[a] |  |  |  |  |  |
| Rolling Ball Tack, cm | >30 | >30 | >30 | >30 | 25 |
| Polyken Probe Tack, kg | 0.91 | 0.68 | 0.43 | 0.30 | 0.57 |
| Loop Tack, oz/in | 51 | 44 | 41 | 50 | 46 |
| 180° Peel, pli | 4.3 | 4.0 | 4.2 | 3.8 | 3.6 |
| HP to Steel (1 × 1, 2 kg), min | >7000 | >7000 | >7000 | >7000 | >7000 |
| SAFT to Mylar (1 × 1, .5 kg), ° C. | 104 | 98 | 98 | 95 | 90 |

[a]PSA were dissolved in toluene and cast at 1.8 mil dry thickness on 1 mil Mylar.

Example 3

Example 3 shows compatibility of CD Polymer #25 with hydrogenated water-white tackifying resins. Regalite R91, available from Eastman, is believed to be made by polymerizing a $C_9$ stream followed by elimination of nearly 100% of the aromaticity by hydrogenation. The Regalrez series of resins are believed to be made by polymerizing pure aromatic monomers such as styrene or vinyl toluene followed by hydrogenation. Regalrez 1094, 6108 and 3102 were hydrogenated to eliminate about 100%, 60% and 30% of the aromaticity, respectively. Results show that all four of the resins are effective tackifiers for CD Polymer #25, although Regalrez 3102, having 70% aromaticity, is the least effective tackifier. DRAKEOL 34 is available from Penreco and is a paraffinic processing oil have a Tg of −64° C.

TABLE 3

|  | #3-1 | #3-2 | #3-3 | #3-4 |
| --- | --- | --- | --- | --- |
| Composition, % w |  |  |  |  |
| CD Polymer #25 | 35.0 | 35.0 | 35.0 | 35.0 |
| REGALITE R91 | 44.0 |  |  |  |
| REGALREZ 1094 |  | 41.5 |  |  |
| REGALREZ 6108 |  |  | 41.5 |  |
| REGALREZ 3102 |  |  |  | 41.5 |
| DRAKEOL 34 | 21.0 | 23.5 | 23.5 | 23.5 |
| Properties [a] |  |  |  |  |
| Rolling Ball Tack, cm | 6 | 4 | 9 | 26 |
| Polyken Probe Tack, kg | 0.62 | 0.74 | 0.73 | 0.21 |
| Loop Tack, oz/in | 32 | 63 | 69 | 47 |
| 180° Peel, pli | 1.9 | 2.6 | 1.9 | 1.7 |
| SAFT to Mylar (1 × 1, .5 kg), ° C. | 90 | 92 | 82 | 84 |

[a]PSA were mixed in toluene and cast at 1.9 mil dry thickness on 1 mil Mylar.

Example 4

Example 4 shows the effect of adhesive composition on properties using CD Polymer #27 with hydrogenated resin and water-white oil. Formulations 4-1, 4-2 and 4-3 show the effect of polymer content, keeping the glass transition temperature (Tg) calculated with the Fox equation constant at −14° C. Results show the expected trends that increasing polymer content increases SAFT and melt viscosity without a big effect on tack and peel. Formulations 4-3, 4-4 and 4-5 show the effect of increasing the adhesive Tg, keeping the polymer contents constant at 40% weight. Results show the expected trends that increasing Tg reduces tack and increases peel without a big effect on SAFT or melt viscosity.

TABLE 4

|  | #4-1 | #4-2 | #4-3 | #4-4 | #4-5 |
| --- | --- | --- | --- | --- | --- |
| Composition, % w |  |  |  |  |  |
| CD Polymer #27 | 30.0 | 35.0 | 40.0 | 40.0 | 40.0 |
| REGALITE R-91 | 46.0 | 44.0 | 42.1 | 45.2 | 48.1 |
| DRAKEOL 34 | 24.0 | 21.0 | 17.9 | 14.8 | 11.9 |
| Calculated Tg, ° C. | −14 | −14 | −14 | −10 | −7 |
| Properties[a] |  |  |  |  |  |
| Rolling Ball Tack, cm | 8 | 10 | 13 | 14 | >30 |
| Polyken Probe Tack, kg | 0.70 | 0.58 | 0.54 | 0.59 | 0.40 |
| Loop Tack, oz/in | 55 | 64 | 65 | 79 | 69 |
| 180° Peel, pli | 1.8 | 1.7 | 1.7 | 2.1 | 2.5 |
| SAFT to Mylar (1 × 1, .5 kg), ° C. | 77 | 80 | 88 | 83 | 84 |
| Melt Vis @ 177° C., Pa · s | 8 | 15 | 29 | 35 | 39 |

[a]PSA were mixed as hot melts, dissolved in toluene and cast at 2 mil dry thickness on 1 mil Mylar.

Example 5

Example 5 shows the effect of polymer structure on adhesive properties. Samples #5-1 and #5-2 show the effect of polymer molecular weight. Results show the higher molecular weight polymer gives higher SAFT and higher melt viscosity. Samples # 5-2 through #5-6 show the effect of tri-block/di-block ratio in the polymer. CD Polymer #28 is an AB di-block copolymer. Results show that melt viscosity decreases as the fraction of tri-block in the polymer decreases. Adhesive properties do not change dramatically until the di-block content of the polymer approaches 100% weight, as in sample #5-6. The cohesive strength of this sample is low enough that the holding power sample fails cohesively.

TABLE 5

|  | #5-1 | #5-2 | #5-3 | #5-4 | #5-5 | #5-6 |
|---|---|---|---|---|---|---|
| Composition, % w |  |  |  |  |  |  |
| CD Polymer #25 | 40 |  |  |  |  |  |
| CD Polymer #27 |  | 40 | 30 | 20 | 10 |  |
| CD Polymer #28 |  |  | 10 | 20 | 30 | 40 |
| REGALITE R-91 | 45 | 45 | 45 | 45 | 45 | 45 |
| DRAKEOL 34 | 15 | 15 | 15 | 15 | 15 | 15 |
| Properties[a] |  |  |  |  |  |  |
| Rolling Ball Tack, cm | 7 | 15 | 7 | 7 | 6 | 3 |
| Polyken Probe Tack, kg | 0.47 | 0.30 | 0.39 | 0.35 | 0.38 | 0.97 |
| Loop Tack, oz/in | 34 | 75 | 77 | 76 | 72 | 110 |
| 180° Peel, pli | 2.4 | 1.9 | 2.3 | 2.1 | 2.2 | 2.1 |
| HP to Steel (1 × 1, 2 kg), hr | >100 | >100 | >100 | >100 | >100 | 13 c |
| SAFT to Mylar (1 × 1, .5 kg), ° C. | 94 | 82 | 85 | 82 | 76 | 70 |
| Melt Vis @ 177° C., Pa · s | 80 | 36 | 24 | 13 | 8 | 3 |

[a] PSA were mixed as hot melts, dissolved in toluene and cast at 2-mil dry thickness on 1 mil Mylar.

Example 6

Example 6 shows the phase stability of solvent based adhesives containing blends of a typical SIS polymer, SIS #1, with a conventional hydrogenated SBC, SEBS #1, or with the novel CD Polymer #25. SIS #1 has a GPC peak molecular weight of about 245,000, polystyrene end blocks of about 13,000 and a coupling efficiency of about 44%. SEBS #1 is a selectively hydrogenated SBS block copolymer having polystyrene end blocks of about 10,000 and a hydrogenated polybutadiene mid block of about 50,000. All seven adhesives shown in Table 6 were mixed at 40% weight in toluene and the bottles containing the adhesive solutions were then allowed to stand undisturbed to test if they were phase stable. Results show that all three samples based on the individual polymers, #6-1, 6-4 and 6-7, were clear initially and remained unchanged when allowed to stand undisturbed. Samples #6-2 and 6-3, based on the blends of SIS #1 and SEBS #1, were hazy initially and phased separated upon standing into two clear layers. Gel Permeation Chromatography (GPC) analysis showed the top clear layer contained the SEBS #1 and the bottom clear layer contained the SIS #1. In contrast, samples #6-4 and 6-5, based on the blends of SIS #1 and CD Polymer #25, were clear initially and remained clear even after standing undisturbed. GPC analysis of a sample taken near the top and a sample taken near the bottom of solution #6-4 showed both samples to have the amount of the two polymers, showing that the blends are indeed phase stable. Piccotac 1095 is a primarily aliphatic resin made from mixed monomers and having a softening point of 95° C.

TABLE 6

|  | #6-1 | #6-2 | #6-3 | #6-4 | #6-5 | #6-6 | #6-7 |
|---|---|---|---|---|---|---|---|
| Formulation, % w |  |  |  |  |  |  |  |
| SIS #1 | 35.0 | 23.4 | 11.7 |  | 23.4 | 11.7 |  |
| SEBS #1 |  | 11.7 | 23.4 | 35.0 |  |  |  |
| CD Polymer #25 |  |  |  |  | 11.7 | 23.4 | 35.0 |
| PICCOTAC 1095 | 50.0 | 50.0 | 50.0 | 50.0 | 50.0 | 50.0 | 50.0 |
| SHELLFLEX 371 | 15.0 | 15.0 | 15.0 | 15.0 | 15.0 | 15.0 | 15.0 |
| Adhesive Solution |  |  |  |  |  |  |  |
| Initial | clear | hazy | hazy | clear | clear | clear | clear |
| After 3 days | clear | separated | separated | clear | clear | clear | clear |

Example 7

Example 7 shows properties of adhesives based on blends of SIS #1 with CD Polymer #25. Adhesives #7-1 and #7-4, based on the individual polymers, were mixed as hot melt adhesives in a sigma blade mixer and were then dissolved at 40% weight in toluene. Solutions #7-1 and #7-4 were then blended together in a 2/1 or 1/2 ratio, giving solutions # 7-2 and #7-3. All four solutions were clear and phase stable. They were cast at 2-mil dry thickness on 1 mil polyester backing and adhesive properties were measured. Results on samples #7-1 and 7-2 show that at least ⅓ of the SIS #1 can be replaced with CD Polymer #25 with little reduction in tack. The presence of the hydrogenated polymer in sample #7-2 would be expected to give this adhesive better stability than #7- 1. Results on samples #7-3 and 7-4 show that replacing ⅓ of CD Polymer #25 by SIS #1 gives a significant improvement in tack while maintaining high holding power.

TABLE 7

|  | #7-1 | #7-2 | #7-3 | #7-4 |
|---|---|---|---|---|
| Formulation. % w |  |  |  |  |
| SIS #1 | 35.0 |  |  |  |
| CD Polymer #25 |  |  |  | 35.0 |
| PICCOTAC 1095 | 45.0 |  |  | 45.0 |
| SHELLFLEX 371 | 20.0 |  |  | 20.0 |
| Blend #7-1 |  | 67 | 33 |  |
| Blend #7-4 |  | 33 | 67 |  |
| Adhesive Properties |  |  |  |  |
| Rolling Ball Tack, cm | 2 | 4 | 15 | >30 |
| Loop Tack, oz/in | 89 | 83 | 60 | 49 |
| 180° Peel, pli | 6.1 | 3.5 | 2.2 | 2.0 |
| HP to Steel,1 × 1, 2 kg, hr | 19 | 30 | >80 | >80 |
| SAFT, 1 × 1, .5 kg, ° C. | 75 | 80 | 88 | 97 |

Example 8

Polymer SIS #1 has a coupling efficiency of 44%, meaning it contains 44% SIS triblock polymer and 56% uncoupled SI diblock polymer. One can simulate a CD Polymer having 44% coupling efficiency by blending CD Polymer #27, which is 100% triblock polymer, and CD Polymer #28, which is 100% diblock polymer, in a 44/56 ratio. Example 8 shows properties of adhesives based on blends of SIS #1 with blends of CD Polymer #27 and CD Polymer #28 at a 44/56 ratio. Adhesive #8-1 is based on SIS #1 and adhesive # 8-4 is based on the blend of CD Polymers #27 and #28. In adhesive #8-2, ⅓ of the SIS polymer has been replaced by CD Polymer and in adhesive #8-3, ⅓ of the CD polymer has been replaced by SIS polymer. Results show that replacing ⅓ of the SIS polymer in adhesive #8-1 with CD polymer causes only a small reduction in tack and replacing ⅓ of the CD polymer with SIS polymer gives a significant improvement in tack.

The heat aging characteristics of these four adhesives were determined by placing 50 gram samples of each hot melt adhesive in 100 ml beakers, covering the beakers with aluminum foil and aging the adhesives in an oven at 177° C. All four adhesives were clear and there was no phase separation during heat aging, indicating that SIS #1 and the CD Polymers #27 and #28 have good compatibility. Melt viscosity of the adhesives was measured unaged and after 8 hours, 24 hours and 48 hours in the oven. Results on adhesive #8-1 show the SIS polymer is badly degraded by heat aging, retaining only 6% of its initial viscosity after aging 48 hours in the oven. Results on adhesive #8-4 show the CD Polymers have good stability, retaining 83% of its initial viscosity after 48 hours in the oven. Results on adhesive #8-2 show that replacing ⅓ of the SIS polymer with CD polymer retards the rate of viscosity loss, thereby improving the heat aging stability of the adhesive.

TABLE 8

|  | #8-1 | #8-2 | #8-3 | #8-4 |
|---|---|---|---|---|
| Formulation, % w |  |  |  |  |
| SIS #1 | 35.0 | 23.3 | 11.7 |  |
| CD Polymer #27 |  | 5.2 | 10.5 | 15.8 |
| CD Polymer #28 |  | 6.4 | 12.8 | 19.3 |
| REGALITE R91 | 45.0 | 45.0 | 45.0 | 45.0 |
| DRAKEOL 34 | 20.0 | 20.0 | 20.0 | 20.0 |
| Adhesive Properties[a] |  |  |  |  |
| Rolling Ball Tack, cm | 1.5 | 1.8 | 2.7 | 5.5 |
| Loop Tack, oz/in | 95 | 81 | 53 | 47 |
| 180° Peel, pli | 1.8 | 1.5 | 2.0 | 2.1 |
| HP to Steel, 1 × 1, 2 kg, hr | >100 | >100 | >100 | >100 |
| SAFT, 1 × 1, .5 kg, ° C. | 85 | 77 | 76 | 77 |
| Finger Tack | exc | exe | v good | good |
| Melt Viscosity @ 177 ° C., Pa · s |  |  |  |  |
| Initial | 8460 | 6540 | 5200 | 6140 |
| after 8 hr @ 177° C. | 5020 | 4620 | 4740 | 5360 |
| after 24 hr @ 177° C. | 2700 | 2040 | 4320 | 5460 |
| after 48 hr @ 177° C. | 520 | 1540 | 3020 | 5080 |
| Melt Viscosity Retention, % |  |  |  |  |
| Initial | 100 | 100 | 100 | 100 |
| after 8 hr @ 177° C. | 59 | 71 | 91 | 87 |
| after 24 hr @ 177° C. | 32 | 31 | 83 | 89 |
| after 48 hr @ 177° C. | 6 | 24 | 58 | 83 | a)Adhesives were mixed as hot melts, dissolved in toluene, cast on 2 mil Mylar at 1.8 mil dry thickness.

Example 9

Example 9 compares solubility of the conventional hydrogenated SBC, SEBS #2, and the CD Polymer #26 in mixtures of a hydrocarbon solvent, toluene, with a VOC exempt solvent, p-chlorobenzotriflouride (PCBTF), available commercially as KESSCHEM 100 from Kessler Chemical, or with t-butyl acetate (tBAc) which is expected to become a VOC exempt solvent soon. SEBS #2 is a selectively hydrogenated SBS block copolymer having polystyrene end blocks of about 7,000 and a hydrogenated polybutadiene mid block of about 65,000. Results show that, as expected, both polymers readily dissolve in toluene because toluene is a good solvent for both the polystyrene endblocks and the rubber midblock of both polymers. However, because of government restrictions on VOC, use of hydrocarbon solvents is severely restricted. Results in Table 10 show that, as toluene is replaced with PCBTF, viscosity increases but the polymer still dissolves in blends containing up to 80% PCBTF. However, SEBS #2 will not dissolve in 100% PCBTF because PCBTF is not a good solvent for the rubber segment. In contrast, PCBTF is a good solvent for the rubber block of CD Polymer #26 and so it will dissolve in a completely VOC exempt solvent.

Results in Table 9 show that SEBS #2 will dissolve in blends of toluene with tBAc containing up to 60% weight tBAc. The blend with 80% tBAc is a clear gel and with 100% tBAc, the solvent is too polar to dissolve the rubber block of SEBS #2. In contrast, CD Polymer #26 will dissolve in 100% tBAc if necessary to meet VOC restrictions. However, a solvent blend containing 20% weight toluene and 80% w tBAc is a better solvent because it gives the solution of CD Polymer #26 a much lower viscosity.

TABLE 9

| Solvent Blend, % w | | Viscosity[a], cps | |
|---|---|---|---|
| Toluene | | SEBS #2 | CD Polymer #26 |
| | PCBTF | | |
| 100 | 0 | 500 | 160 |
| 80 | 20 | 750 | — |
| 60 | 40 | 1110 | — |
| 40 | 60 | 2070 | 530 |
| 20 | 80 | 5120 | 960 |
| 0 | 100 | Clear gel | 1980 |
| | t-BAc | | |
| 100 | 0 | 500 | 160 |
| 80 | 20 | 600 | — |
| 60 | 40 | 1210 | — |
| 40 | 60 | 12900 | 280 |
| 20 | 80 | Clear gel | 450 |
| 0 | 100 | Insoluble | 9300 | a)Brookfield viscosity @ 25° C. @ 20% polymer in solvent blend.

The invention claimed is:

1. A pressure sensitive adhesive composition comprising 100 parts by weight of at least one hydrogenated block copolymer, about 25 to about 300 parts by weight of a compatible styrene/isoprene unhydrogenated block copolymer, about 25 to about 300 parts by weight of at least one tackifying resin and about zero to about 200 parts by weight of an extending oil, wherein said hydrogenated block copolymer has at least one polymer block A and at least one polymer block B, and wherein:
 a. prior to hydrogenation each A block is a mono alkenyl arene homopolymer block and each B block is a controlled distribution copolymer block of at least one conjugated diene and at least one mono alkenyl arene;
 b. subsequent to hydrogenation about 0–10% of the arene double bonds have been reduced, and at least about 90% of the conjugated diene double bonds have been reduced;
 c. each A block having a number average molecular weight between about 3,000 and about 60,000 and each B block having a number average molecular weight between about 20,000 and about 300,000;

d. each B block comprises terminal regions adjacent to the A blocks that are rich in conjugated diene units and one or more regions not adjacent to the A blocks that are rich in mono alkenyl arene units;

e. the total amount of mono alkenyl arene in the hydrogenated block copolymer is about 20 percent weight to about 80 percent weight; and f. the weight percent of mono alkenyl arene in each B block is between about 10 percent and about 75 percent.

2. The adhesive composition according to claim 1 wherein said mono alkenyl arene is styrene and said conjugated diene is selected from the group consisting of isoprene and butadiene.

3. The adhesive composition according to claim 2 wherein said conjugated diene is butadiene, and wherein about 20 to about 80 mol percent of the condensed butadiene units in block B have 1,2-configuration.

4. The adhesive composition according to claim 3 wherein the styrene blockiness of the block B is less than about 40 mol percent.

5. The adhesive composition according to claim 4 wherein the polymer is an ABA polymer and each block B has a center region with a minimum ratio of butadiene units to styrene units.

6. The adhesive composition according to claim 3 wherein the weight percent of styrene in each B block is between about 10 percent and about 30 percent, and the styrene blockiness index of each block B is less than about 10 percent, said styrene blockiness index being defined to be the proportion of styrene units in the block B having two styrene neighbors on the polymer chain.

7. The adhesive composition according to claim 3 wherein said hydrogenated block copolymer is an ABA, $(A-B)_n$, $(A-B)_nA$, or $(A-B)_nX$ block copolymer where n is an integer from 2 to about 30, X is the coupling agent residue, said block copolymer having a total number average molecular weight of about 40,000 to about 140,000 and wherein each B block has between 10 and 30 weight percent styrene.

8. The adhesive composition according to claim 7 comprising 100 parts by weight of said hydrogenated block copolymer, about 75 to about 200 parts by weight of a tackifying resin and 0 to about 150 parts by weight of a polymer extending oil.

9. The adhesive composition according to claim 8 also comprising 0 to about 50 parts by weight of an end block resin.

10. The adhesive composition according to claim 1 wherein said tackifying resin is selected from the group consisting of $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, resins esters, resin derivatives and mixtures thereof.

11. The adhesive composition according to claim 1 wherein said tackifying resin is selected from the group consisting of coumarone-indene resin, polyindene resin, poly(methyl indene) resin, polystyrene resin, vinyltoluene-alphamethylstyrene resin, alphamethylstyrene resin, polyphenylene ether and mixtures thereof.

12. The adhesive composition according to claim 1 wherein said extending oil is a petroleum-based white oil having an aromatics content less than about 50 weight percent.

13. The adhesive composition according to claim 1 also comprising additional components selected from the groups consisting of antioxidants, stabilizers, fillers, and additional auxiliaries.

14. A hot melt, pressure sensitive adhesive comprising the composition of claim 8.

15. The hot melt, pressure sensitive composition according to claim 14 also comprising an end block resin.

16. A solvent based adhesive composition comprising the composition of claim 1 and a compatible solvent selected from the group consisting of aromatic hydrocarbon solvents, aliphatic hydrocarbon solvents, polar solvents and mixtures thereof.

17. The solvent based adhesive composition according to claim 16 wherein said solvent is an aromatic hydrocarbon solvent.

18. A pressure sensitive adhesive composition comprising 100 parts by weight of at least one hydrogenated block copolymer, about 25 to about 300 parts by weight of a compatible styrene/isoprene unhydrogenated block copolymer, about 50 to about 500 parts by weight of a tackifying resin, and about 0 to about 200 parts by weight of a polymer extending oil, wherein said hydrogenated block copolymer has the general configuration

A-B,

A-B-A, $(A-B)_n$ $(A-B)_n$-A $(A-B-A)_nX$ or $(A-B)_nX$, where n is an integer from 2 to about 30, and X is coupling agent residue and wherein:

a. prior to hydrogenation each A block is a mono alkenyl arene homopolymer block and each B block is a controlled distribution copolymer block of at least one conjugated diene and at least one mono alkenyl arene;

b. subsequent to hydrogenation about 0–10% of the arene double bonds have been reduced, and at least about 90% of the conjugated diene double bonds have been reduced;

c. each A block having a number average molecular weight between about 3,000 and about 60,000 and each B block having a number average molecular weight between about 20,000 and about 300,000;

d. each B block comprises terminal regions adjacent to the A blocks that are rich in conjugated diene units and one or more regions not adjacent to the A blocks that are rich in mono alkenyl arene units;

e. the total amount of mono alkenyl arene in the hydrogenated block copolymer is about 20 percent weight to about 80 percent weight; and f. the weight percent of mono alkenyl arene in each B block is between about 10 percent and about 75 percent.

19. The adhesive composition according to claim 18 wherein said compatible styrene/isoprene unhydrogenated block copolymer is an S-I-S block copolymer having a number average molecular weight of about 100,000 to about 350,000, and a styrene content of between about 12 and about 20 weight percent.

20. The adhesive composition according to claim 19 wherein said hydrogenated block copolymer is a linear hydrogenated styrene/butadiene block copolymer having a total number average molecular weight of about 25,000 to about 150,000.

21. The adhesive composition according to claim 20 wherein the amount of styrene/isoprene unhydrogenated block copolymer is between about 50 and about 200 parts by weight.

22. The adhesive composition according to claim 18 wherein said styrene/isoprene unhydrogenated block copolymer comprises a linear S-I-S block copolymer and an S-I diblock copolymer.

23. The adhesive composition according to claim 1 wherein said hydrogenated block copolymer is a functionalized selectively hydrogenated block copolymer wherein the block copolymer has been grafted with an acid compound or its derivative.

24. The adhesive composition according to claim 23 wherein said acid compound or its derivative is selected from the group consisting of maleic anhydride, maleic acid, fumaric acid, and their derivatives.

25. The adhesive composition according to claim 1 wherein said hydrogenated block copolymer is a functionalized selectively hydrogenated block copolymer wherein the block copolymer has a sulfonic acid or sulfonate functional group.

26. The adhesive composition according to claim 25 wherein at least 50 percent of the sulfonic functional groups are present as zinc salts.

27. The adhesive composition according to claim 25 wherein the block copolymer has from about one (1) sulfonic acid or sulfonate group per molecule of the block copolymer to about (1) sulfonic acid or sulfonate group per aromatic ring of the block copolymer.

28. The adhesive composition according to claim 27 wherein the block copolymer has from about three (3) sulfonic acid or sulfonate groups per molecule of the block copolymer to about (1) sulfonic acid or sulfonate group per two (2) aromatic rings of the block copolymer.

29. The adhesive composition according to claim 28 wherein the mono alkenyl arene is styrene and the conjugated diene is selected from the group consisting of isoprene and butadiene.

30. The adhesive composition according to claim 29 wherein the conjugated diene is butadiene, and wherein about 20 to about 80 mol percent of the condensed butadiene units in block B have 1,2-configuration prior to hydrogenation.

31. The adhesive composition according to claim 30 wherein the weight percentage of styrene in the B block is between about 10 percent and about 40 percent, and the styrene blockiness index of the block B is less than about 10 percent, the styrene blockiness index being the proportion of styrene units in the block B having two styrene neighbors on the polymer chain.

32. The adhesive composition according to claim 25 comprising 100 parts by weight of said block copolymer, about 75 to about 200 parts by weight of a tackifying resin and 0 to about 150 parts by weight of a polymer extending oil.

33. The adhesive composition according to claim 32 wherein the block copolymer has from about one (1) sulfonic acid or sulfonate group per molecule of the block copolymer to about (1) sulfonic acid or sulfonate group per aromatic ring of the block copolymer.

34. The adhesive composition according to claim 33 wherein the mono alkenyl arene is styrene and the conjugated diene is selected from the group consisting of isoprene and butadiene.

35. The adhesive composition according to claim 33 wherein the conjugated diene is butadiene, and wherein about 20 to about 80 mol percent of the condensed butadiene units in block B have 1,2-configuration prior to hydrogenation.

36. The adhesive composition according to claim 34 wherein the weight percentage of styrene in the B block is between about 20 percent and about 80 percent.

* * * * *